(12) United States Patent
Mührke et al.

(10) Patent No.: US 9,025,066 B2
(45) Date of Patent: May 5, 2015

(54) FILL WITH CAMERA INK

(75) Inventors: Thomas H. Mührke, Hamburg (DE);
Andreas Wurf, Hamburg (DE)

(73) Assignee: Adobe Systems Incorporated, San Jose, CA (US)

(*) Notice: Subject to any disclaimer, the term of this patent is extended or adjusted under 35 U.S.C. 154(b) by 121 days.

(21) Appl. No.: 13/555,262

(22) Filed: Jul. 23, 2012

(65) Prior Publication Data

US 2014/0022405 A1    Jan. 23, 2014

(51) Int. Cl.
*H04N 5/232*    (2006.01)
*H04N 5/222*    (2006.01)
*G09G 5/397*    (2006.01)

(52) U.S. Cl.
CPC ........... *G09G 5/397* (2013.01); *H04N 5/23293* (2013.01); *G09G 2340/10* (2013.01); *H04N 5/2228* (2013.01); *H04N 5/23212* (2013.01); *H04N 5/23296* (2013.01)

(58) Field of Classification Search
CPC .......... H04N 5/23293; H04N 5/23219; H04N 5/2228; H04N 5/23212; H04N 5/23296; G06F 3/04883; G09G 5/397; G09G 2340/10
USPC ......... 348/207.99, 211.4, 222.1, 239, 333.05, 348/333.11, 333.12, 584, 218.1; 358/3.01; 345/625; 455/566
See application file for complete search history.

(56) References Cited

U.S. PATENT DOCUMENTS

| | | | |
|---|---|---|---|
| 6,621,524 B1* | 9/2003 | Iijima et al. | 348/584 |
| 2005/0046729 A1* | 3/2005 | Taguchi et al. | 348/333.11 |
| 2005/0219384 A1* | 10/2005 | Herberger et al. | 348/239 |
| 2006/0077266 A1* | 4/2006 | Nurmi | 348/239 |
| 2006/0098112 A1* | 5/2006 | Kelly | 348/333.12 |
| 2006/0285164 A1* | 12/2006 | Wang | 358/3.01 |
| 2008/0036789 A1* | 2/2008 | de Leon | 345/625 |
| 2008/0119235 A1* | 5/2008 | Nielsen et al. | 455/566 |
| 2008/0266414 A1* | 10/2008 | Park | 348/222.1 |
| 2010/0053342 A1* | 3/2010 | Hwang et al. | 348/207.99 |
| 2010/0289910 A1* | 11/2010 | Kamshilin | 348/211.4 |
| 2013/0120602 A1* | 5/2013 | Huang | 348/218.1 |

OTHER PUBLICATIONS

Brown, "Adobe Photoshop Touch and Camera Fill", https://www.youtube.com/watch?v=heOVrFWn4XE , Sep. 30, 2011.*
Adobe, "Adobe Photoshop CS5 Integrates Tablets into Creative Workflows", Apr. 11, 2011.*
google.com, "Cam Pad" at Chrome Web Store, https://chrome.google.com/webstore/detail/cam-pad/mpdnbodlklpglokdnlgimdpkafighlbf?hl=en#detail/cam-pad/mpdnbodlklpglokdnlgimdpkafighlbf/details?hl=en , dates the Cam Pad app to Jun. 25, 2012.*
archive.org, "CamPad Webcam Drawing Online At Real-Time", https://web.archive.org/web/20120521124158/http://campad.htmlchat.net/ , dating http://campad.htmlchat.net to May 21, 2012.*
Andy70707, "webcam draw", http://www.newgrounds.com/portal/view/410030 , Nov. 12, 2007.*

(Continued)

*Primary Examiner* — Dennis Hogue

(74) *Attorney, Agent, or Firm* — Wolfe-SBMC

(57) ABSTRACT

A content editing application may receive preview image data from a sensor. The preview image data may be displayed within an interface of the content editing application. The content editing application may request that the sensor capture a final image and the final image may be displayed within the interface of the content editing application.

20 Claims, 17 Drawing Sheets

(56) References Cited

OTHER PUBLICATIONS

TonioMiguel, "WebCam Face Painter", http://www.newgrounds.com/portal/view/331298 , Aug. 14, 2006.*

Yllier, "Webcam Drawing", http://www.kongregate.com/games/yllier/webcam-drawing , Dec. 31, 2007.*

Fun Face Cam!, http://www.funfacecam.com/fun/games/247/the-bieber-.html , dated to Feb. 15, 2011 via archive.org.*

Murphy, "Google Adds Kitty, Puppy masks to Google+ Hangouts", http://www.pcmag.com/article2/0,2817,2401126,00.asp , Mar. 4, 2012.*

Kravitz, "Reindeer Flicking on Google hangouts", https://www.youtube.com/watch?v=ByZUdlMkPc0 , Jan. 11, 2012.*

Salas, "messing with 'Moustaches' in Google+Hangouts", https://www.youtube.com/watch?v=u1jBEiJ8u90 , Dec. 5, 2011.*

Cole, "Google Effects on + hangouts!", https://www.youtube.com/watch?v=ZnEKPvoUrSQ , Jul. 18, 2012.*

Cam Pad, web app by HTML Chat, http://campad.htmlchat.net , dated to May 21, 2012 via wayback machine at archive.org.*

* cited by examiner

FILL WITH CAMERA INK

BACKGROUND

Image editing applications typically have tools and/or actions to apply ink to certain areas of an image to change the color of pixels contained in the image. The ink may act on the whole image or on the selection of image pixels. The ink itself may be a solid color, a gradient, a pattern, a filter, etc.

Composing pictures taken with a camera into an image in an image editing application is typically a multi-step process. First, the user has to launch an application to take a picture. On handheld devices, those applications are typically pre-installed. They differ from device to device in terms of operability, functionality, and user interface. After pressing a snapshot button, the picture is typically saved in a photo or picture gallery. Then, the user switches to an image editing application and imports the recently taken picture from the gallery into the image editing application. Such a sequence is disruptive to the creative workflow. The user has to leave the image editing application, enter the context of the picture taking application and then return to the image editing application to process the taken picture. The user has no chance to get a visualization of the resulting composition while taking the picture. Instead, the user has to use tools in the image editing application to compose the picture into his image (e.g., crop, scale, transform, etc.).

SUMMARY

This disclosure describes techniques and structures for using data from a sensor (e.g., camera) as an input within the context of a content editing application. In one embodiment, an image editing application executing on a computing device may receive preview image data from an image sensor coupled to the computing device. The preview image data may be displayed within an interface of the image editing application. Such display of preview image data may be in one layer of a plurality of image layers. The image editing application may request that the image sensor capture a final image. The final image may then be displayed within the interface of the image editing application. Such display of the final image may be in the same layer of the plurality of image layers in which the preview image data was displayed.

Figure 1:
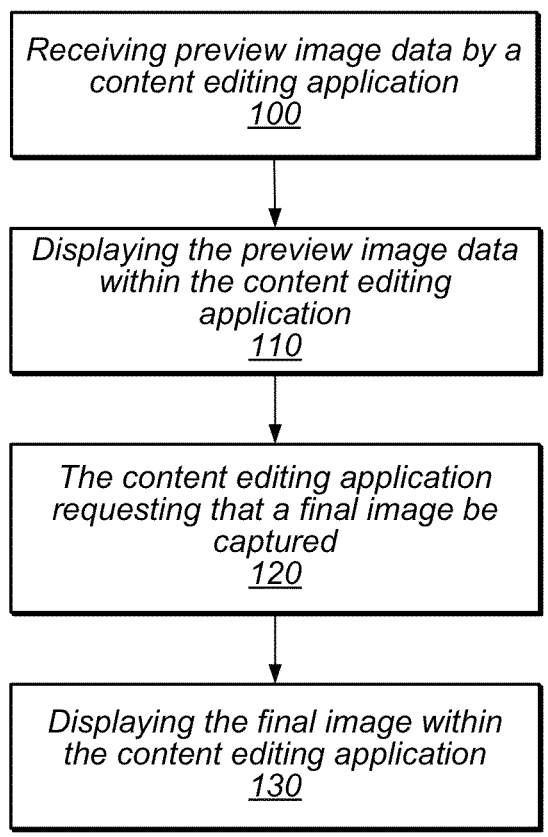
FIG. 1 is a flowchart of an example camera fill technique within an image editing application, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for layers of a composite image, the terms "first" and "second" layers can be used to refer to any two of the layers. In other words, the "first" and "second" layers are not limited to logical layers 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for camera fill in an image editing application are described. Some embodiments may include a means for performing camera fill by a content editing application. For example, an image editing application may receive preview image data from an image sensor coupled to a computing device and display the preview image data within the context of the image editing application. The image editing application may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform displaying preview image data by an image application, as described herein. Other embodiments of the image editing application may be at least partially implemented by hardware circuitry and/or firmware stored, for example, in a non-volatile memory.

Turning now to FIG. 1, one embodiment of camera fill within the context of an image editing application is illustrated. While the blocks are shown in a particular order for ease of understanding, other orders may be used. In some embodiments, the method of FIG. 1 may include additional (or fewer) blocks than shown. Blocks 100-130 may be performed automatically or may receive user input. In one embodiment, blocks 100-130 may be performed by a content editing application, such as content editing application 430 of FIG. 4.

As illustrated at 100, preview image data may be received by a content editing application. For example, content editing application may be an image editing application and preview image data may be still images. Preview image data may be two-dimensional (2D) images, three-dimensional (3D) images, video, text, etc. In one embodiment, the preview image data may be received from an image sensor coupled to a computing device. The image sensor may be housed in the computing device or may be external to the device housing but connected wirelessly or via a hardline. As examples, the image sensor may be a camera of a mobile device (e.g., cellular phone, tablet device, laptop, etc.) or it may be a camera coupled to a desktop computer. In some embodiments, the computing device may include multiple cameras (e.g., forward and rear facing, stereoscopic left and right, etc.).

Preview image data may be HDR, JPEG, BMP, among other formats. In various embodiments, the preview image data may be smaller and lower resolution than full-size, high resolution images. In one embodiment, the sensor may capture full resolution images but those images may be downsampled before be received by the image editing application so that preview image data can be quickly refreshed for a smooth interface and quick responsiveness. In one embodiment, preview image data may include a plurality of image frames taken by the image sensor over time. For example, the image frames may be captured by the image sensor at a rate (e.g., 30 frames per second (fps)).

As shown at 110, the preview image data may be displayed within an interface/display of the content editing application. FIGS. 2E and 3E illustrate example interfaces of preview image data being displayed in an image editing application. In one embodiment, the displayed preview image data may be updated. For example, the preview image data may include a plurality of image frames captured by the image sensor over time (e.g., at some rate such as the 30 fps example above). Displaying the preview image data may include updating the displayed preview image data in real-time. Preview image data may be provided to the content editing application in response to the image sensor capturing the data (e.g., as a frame of the image data is available) or the content editing application may pull (e.g., periodically) the data from the image sensor.

In the preview mode of block 110, the preview image data may be displayed according to whatever layers, filters, or selections are in place. For example, settings such as blend mode, transparency, etc. are honored by preview mode such that the preview image data is displayed according to the blend mode, transparency, etc.

At 120, the content editing application may request that the image sensor capture a final image. Note that use of the term final is used to denote that the final image ends the preview mode in which preview image data is received and displayed. As described herein, other image data may be received after receiving the final image data (e.g., the final image may be discarded and preview mode may be reentered). The request to capture the final image may be generated and sent in response to input received by the content editing application. For example, FIGS. 2E and 3E each include an example of an interface that includes a selectable element, a camera icon in the illustrated example, which may receive the input to cause the content editing application to request a final image capture. In one embodiment, prior to performing the request to capture the final image, the image editing application may receive an input indicating such a request to capture the final image. One example of a received input may be a touch (e.g., finger, mouse, stylus, etc.) input to the camera icon button of the example interface FIGS. 2E and/or 3E. Other selectable inputs may exist that may allow a request to capture the final image to be generated and executed. Such selectable inputs may be a touch input to a user interface of a tablet device or other mobile device, or it may be a shutter button located on the housing of the device. In an embodiment in which a camera is coupled to a desktop computer, the selectable input may be a click of a pointing device, such as a mouse.

In one embodiment, the preview image data may include a series of image frames captured sequentially by the image sensor. Displaying the preview image data may include updating the series of image frames in the order of sequential capture. For instance, if image frames 1-20 of preview image data are captured in the order 1-20, then the preview image data may be updated in the order 1-20. The display of the preview image data may be updated in response to receiving the updated image data. In an embodiment in which the sensor captures images at 30 fps, the sensor may provide the images to the content editing application at 30 fps and the content editing application may update the display of the preview image data at a rate of 30 fps. In such an example, the display of the preview image data may be fluid allowing for a precise capturing of a final image within the context of the image editing application such that other content (e.g., 2D vector graphics, 3D graphics, text, other content, etc.) may be visualized with an image from the image sensor within the context of the image editing application before the final image is captured.

In one embodiment, in response to receiving the input indicating the request to capture the final image, the content editing application may stop updating the interface with display of preview image frames. The content editing application may instruct a camera API to stop capturing and/or sending preview image data until preview mode is reentered. In another embodiment, the content editing application may continue to update the display with the preview image data until the final image is received.

As illustrated at 130, the final image may be displayed within the content editing application. FIGS. 2F-2G and 3F-3G illustrate examples of a final image being displayed within the content editing application. In some embodiments, displaying the final image may include replacing the preview image data. For example, the final image data of FIG. 2F may replace the preview image data of FIG. 2E such that both may not be displayed at the same time. As described herein, the final image may be higher resolution than the preview image data.

In one embodiment, upon receiving the captured final image, the content editing application may prompt a user to keep, cancel/discard, or retake the captured final image. Examples of the prompt to keep, cancel, or retake can be seen in FIGS. 2F and 3F. While the prompt is displayed, the content editing application may instruct a camera application programming interface (API) to stop capturing preview image data until it has been determined whether to keep, discard, or retake the image. If retake is selected, blocks 100, 110, and 120 may be repeated. The prompt may include a time out period in which if none of retake, cancel, or keep is selected, the content editing application may automatically default to one of the options.

In some embodiments, the preview image data and/or final image data, once received by the content editing application, may be displayed in one layer of a plurality of image layers. Other content (e.g., 2D graphics, 3D graphics, video, text, etc.) may be displayed in other layers. For instance, the preview image data and final image data may be in a top-most layer, a middle layer, or a bottom-most layer in a stack of layers whereas other content may reside in one or more other layers. That image that results from the multiple layers of content may be referred to as a composite image.

In some embodiments, one or more pixels, regions, or portions of a selected/active layer may be selected. For example, a blank layer may be created and/or selected and one or more regions of a display area may be selected in that layer. The selected regions may be stored, for example, in a buffer. The stored regions may be used at blocks 110 and/or 130 (and/or other blocks) to define a boundary (e.g., cropping area) into which the preview image data and final image may be displayed (or excluded from display). Thus, the display of the preview image data and/or final image data may be relative to the selected portion/region of the display area. In some embodiments, such selection of one or more regions may be performed before any preview image data or final data is displayed. For instance, the content editing application may be opened, a new layer may be created, and a region may be selected in that new layer prior to any image data being received from the image sensor. In various embodiments, selection of the one or more regions may be made via a brush, wand, lasso, or other selection tool provided by a user interface. The brush may be manipulated by a user to draw a line, circle, point, or other shape via a cursor control device such as a mouse, trackball, touchpad, or keyboard. Other examples that may allow for selection of the one or more regions include a stylus, finger, or other implementation may be used to draw the stroke on a touch-sensitive surface of a touch-enabled input device, such as a touchpad, tablet device, mobile device or touch-sensitive screen. FIGS. 3A-3G show an example of a workflow that includes selection of a region into which preview image data and a final image are displayed.

In some embodiments, the content editing application may communicate with one or more APIs to facilitate the method of FIG. 1. For instance, the content editing application may send an EnumerateCameras command/request to an operating system (OS) API to which the API may respond with a list of image sensors available on the computing device. As examples, the API may respond that the computing device has both forward and rear facing cameras available, that left and right stereoscopic cameras are available, or that a single camera is available.

The content editing application may also send a GetCapabilities command/request to the API to which the API may respond with the capabilities of each image sensor (e.g., front or back facing, zoom range, focus options, flash options, etc.). The content editing application may further send a GetValue command/request to the API to which the API may respond with a current value of a camera setting (e.g., current zoom setting, current focus setting, etc.). The content editing application may additionally send a SetValue command/request to the API to set one or more of the camera settings (e.g., current zoom setting, current focus setting, etc.).

In some embodiments, the content editing application may send an Open command/request to the API to acquire/enable the camera for use within the context of the content editing application. The open command may be generated and sent in response to user input. Such input may include launching the content editing application or selecting a selectable element (e.g., Add Camera Fill as shown in FIGS. 2D and 3D) to activate the camera. The content editing application may send a StartPreview command/request to the API to start the preview mode. The StartPreview mode may be a subcommand that is sent automatically after the Open command is sent. In some embodiments, StartPreview mode may be generated and sent in response to some other input. For example, selection of "Retake" in FIG. 2F may cause StartPreview to be sent so that the preview mode is reentered. As described herein, in preview mode, low resolution preview frame data may be approximately continuously (e.g., at 30 fps as frames are ready, 60 fps, etc.) pushed to or pulled by the content editing application. In some embodiments, concurrent with or after sending the StartPreview mode command, the interface of the content editing application may be population with camera controls (e.g., zoom, flash, focus, snapshot, etc.).

While in the preview mode, the content editing application may send a TakePicture command/request to the API. TakePicture may be generated and sent in response to input to the content editing application and/or computing device. One example of input that may cause TakePicture to be sent includes the camera icon in FIGS. 2E and 3E. Such a command may end the preview mode and cause the camera to take a high resolution image. The high resolution image may then be pushed to or pulled by the content editing application. The content editing application may also send a StopPreview command/request to the API. The StopPreview command may also end the preview mode. In contrast to TakePicture, StopPreview may end the preview mode without capturing a high resolution image. StopPreview may be generated and sent, for example, based on input received to the content editing application. Input that may cause StopPreview to be generated and sent may include: selecting a different layer that does not include camera fill, or selecting an option such as "Cancel" as shown in FIG. 2F. The content editing application may also send a Close command/request to the API, which may cause the camera device to be relinquished and no longer under control of the content editing application. Selecting "Cancel" and/or "Keep" of FIG. 2F may cause a Close command/request to be generated and sent. When "Keep" is selected, the final image may be edited separately or together with content from the other layers.

The disclosed camera fill techniques may allow a more efficient creation and editing workflow by permitting a user to preview an image with other layers, as modified by any effects, prior to capturing the final image. The techniques may streamline the workflow by allowing a user to see what a composite image would look like within the context of single application without having to switch back and forth between applications. Moreover, the techniques may further improve workflow efficiency by allowing a user to obtain an image that may need less editing/additional processing (e.g., cropping, resizing, etc.)

FIGS. 2A-2G and 3A-3G each collectively illustrate an example workflow for creating a composite image with the disclosed camera fill techniques. FIGS. 2A-2G and 3A-3G illustrate an example interface that be used to perform the disclosed camera fill techniques, according to some embodiments.

Figure 2A:
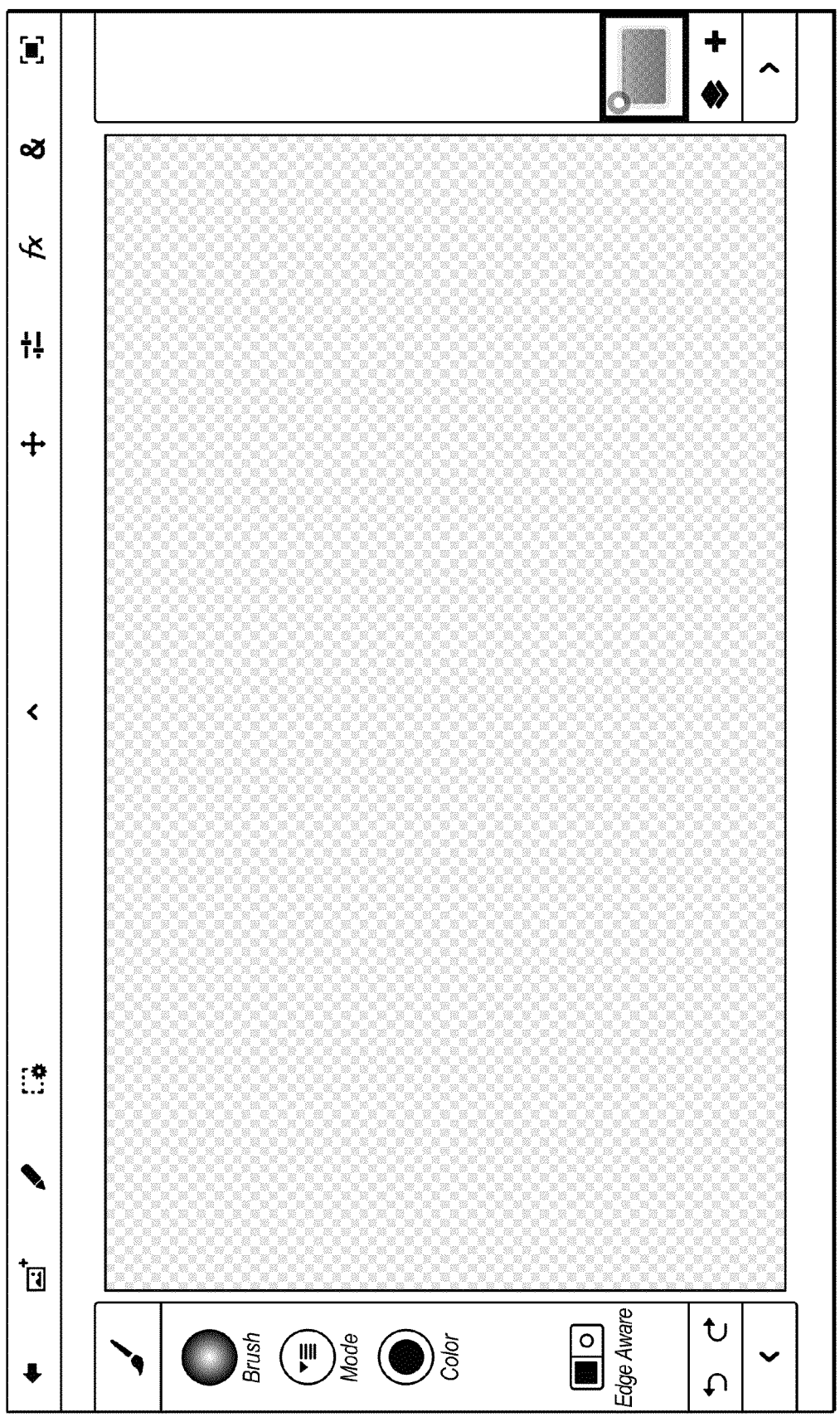
FIGS. 2A-2G illustrate example screenshots of an example image editing application that may implement the disclosed camera fill techniques, according to various embodiments.

Referring to FIG. 2A to describe the example interface, the larger center portion is a content area of the display for the composite image (and for the various layers that make up the composite image). In the right hand column of the interface is an area to show the various layers and the order of the layers as well. As an example, in the right hand column of FIG. 2A, a single checkerboard layer is shown that corresponds to what is displayed in the content area of the display.

Figure 2B:
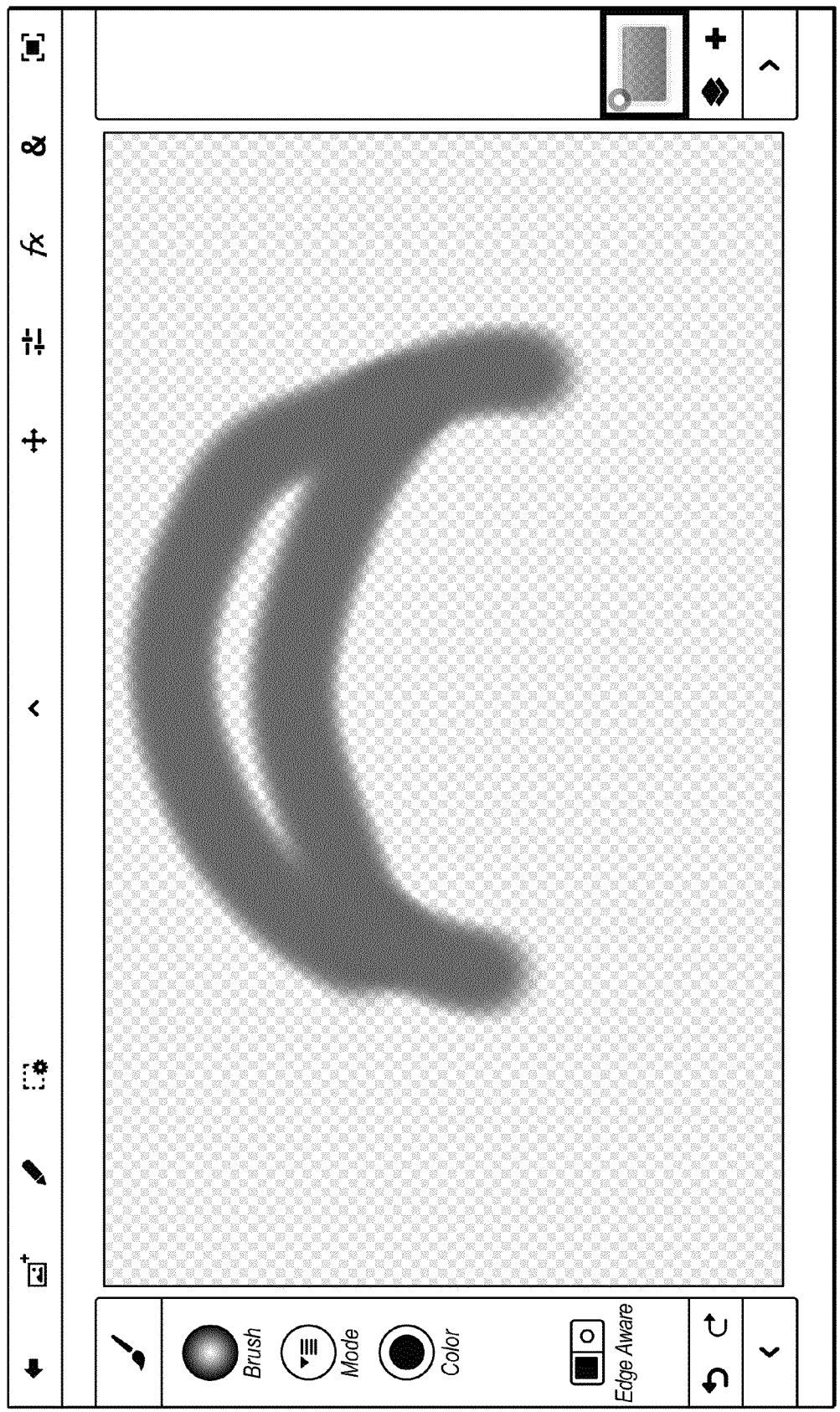
Figure 2C:
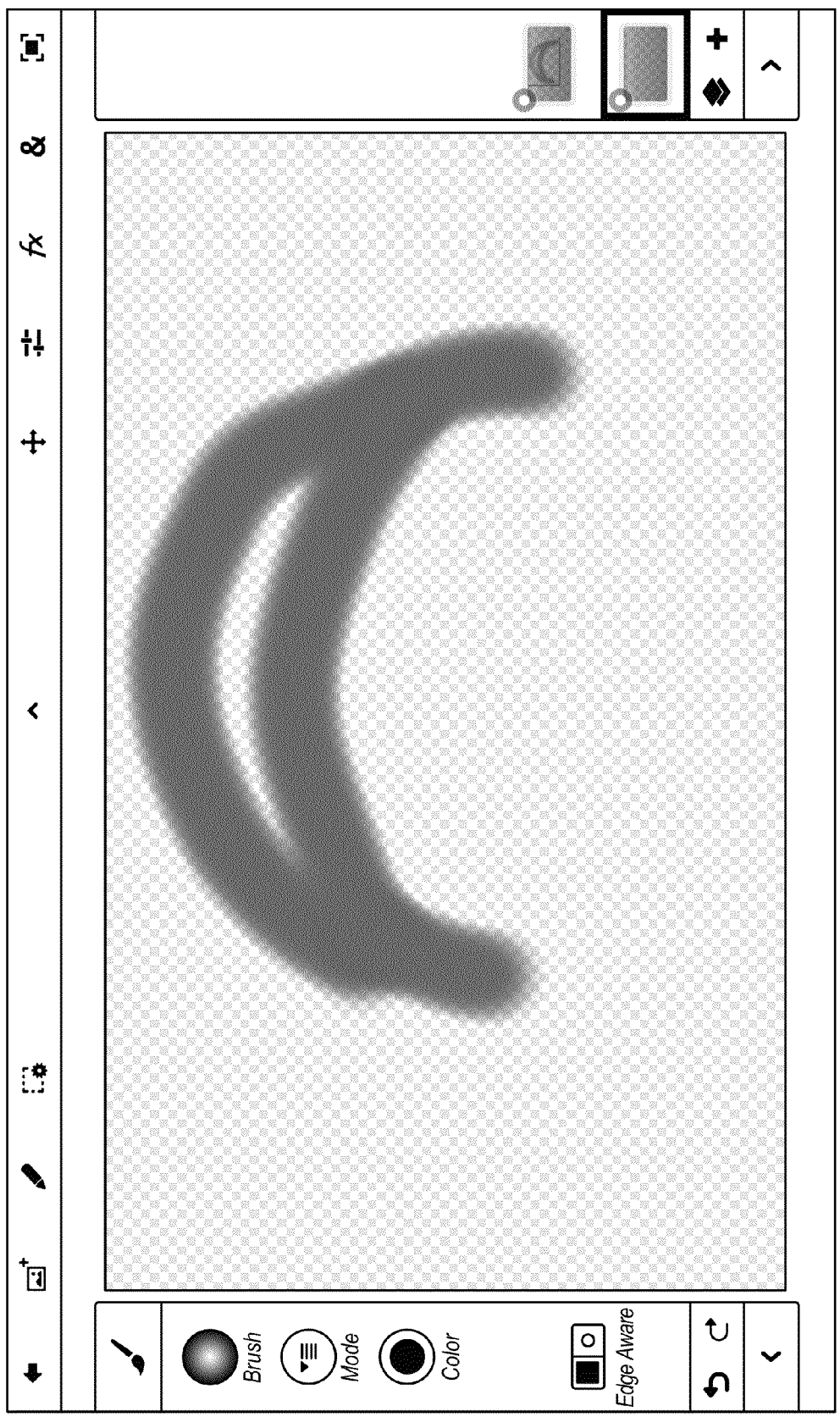
Figure 2D:
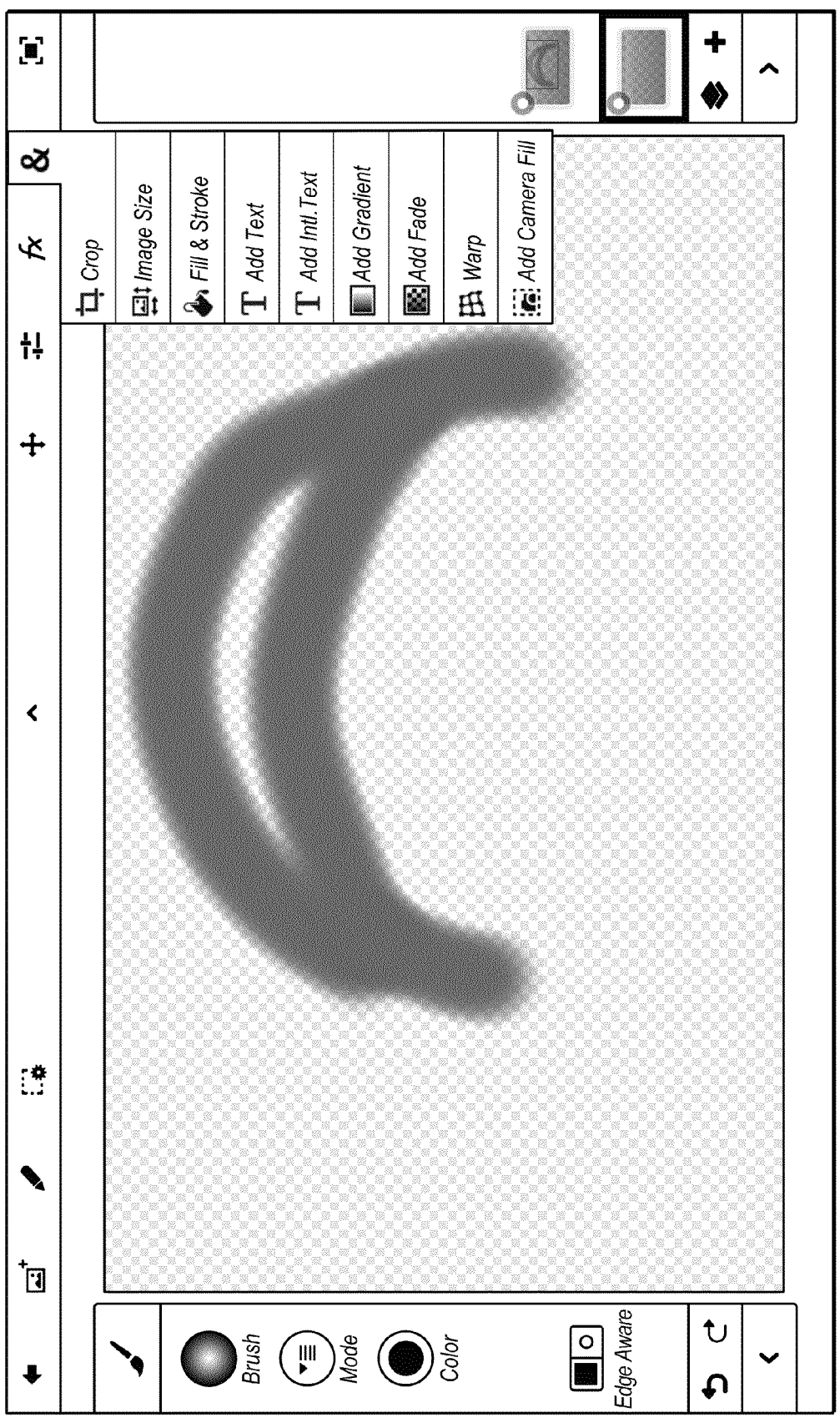
Figure 2E:
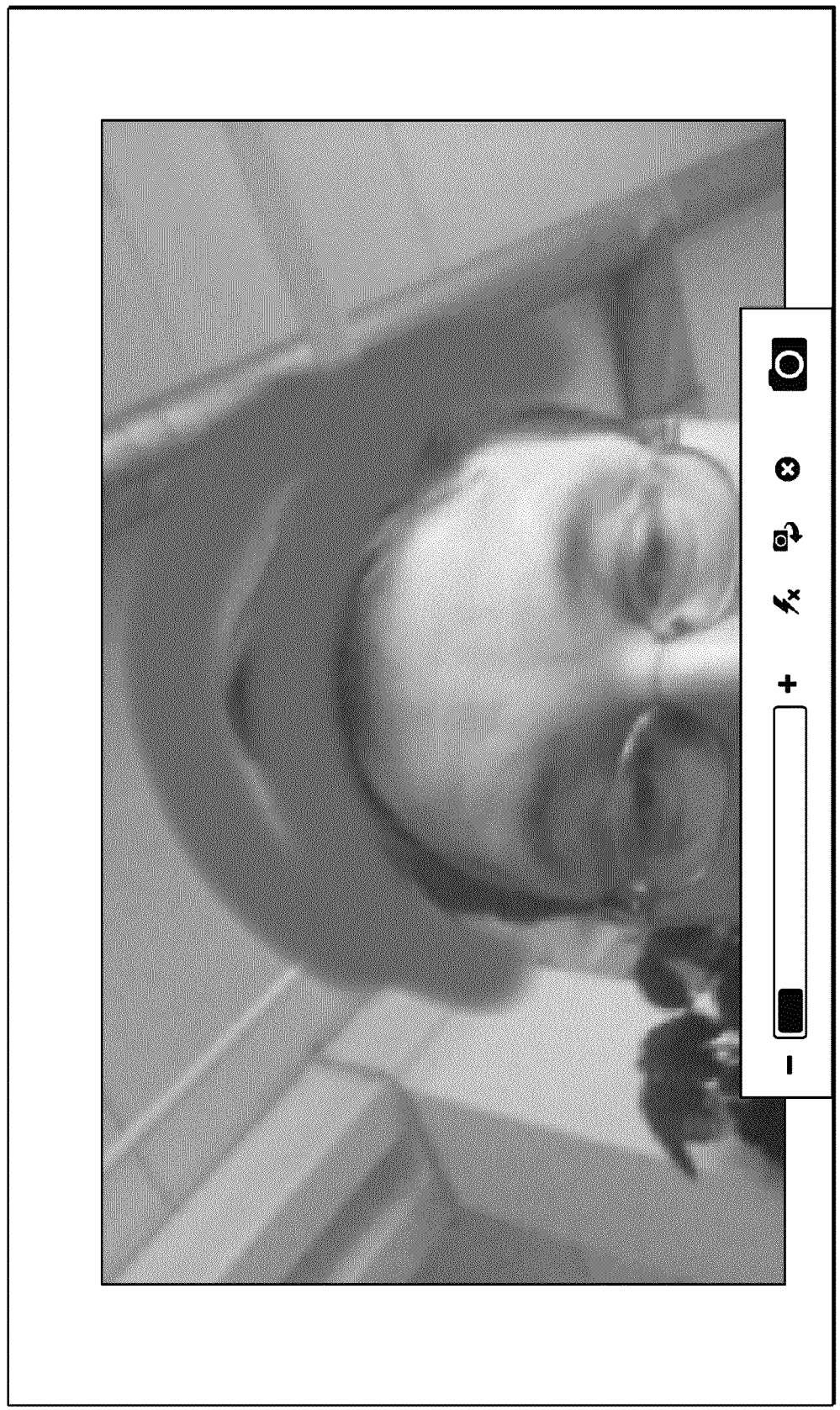
Figure 2F:

FIG. 2B shows a pattern (two arches) drawn into the selected layer, for example, with the brush tool indicated in the left hand column. FIG. 2C illustrates moving the drawn pattern into a separate layer on top of the original layer, as indicated by the layer stack in the right hand column.

In FIG. 2D, the bottom layer is selected as the active layer, as indicated by the selection box around that layer. An option is selected from the & menu at the top of the interface, which presents additional options (e.g., Crop, Image Size, Fill & Stroke . . . , Add Camera Fill). Add Camera Fill is selected, which presents the disclosed preview mode, as shown in FIG. 2E. As shown, the preview mode may display a live preview based on image data from the camera. Because the arches are on a layer higher than the camera fill layer, the arches are shown on top of (overlaid on) the man's head. The preview mode of the content editing application may include a number of inputs to control the camera. As shown in FIG. 2E, when in preview mode, the application may be population with camera controls. For instance, − and + may be used to control the zoom level of the camera. The lightning bolt with an X under it indicates that the flash for the camera is turned off. The camera button with the arrow under it may be an option to switch cameras (e.g., from forward facing to rear facing or vice versa). The X in the circle may be an option to cancel out of preview mode and the large camera icon on the right of the panel may be a shutter input option to capture a high resolution final image. Note that in the illustrated embodiment, each layer (top layer showing arches, and bottom camera fill layer showing man) of the composite image is shown in the preview mode. Selection of one of the options shown in FIG. 2E may cause the content editing application to send a command/request to a camera API, as described herein. For instance, receiving input to the zoom level control (e.g., + or −) may cause the content editing application to send a SetValue command to change the zoom level, as described herein.

Figure 2G:
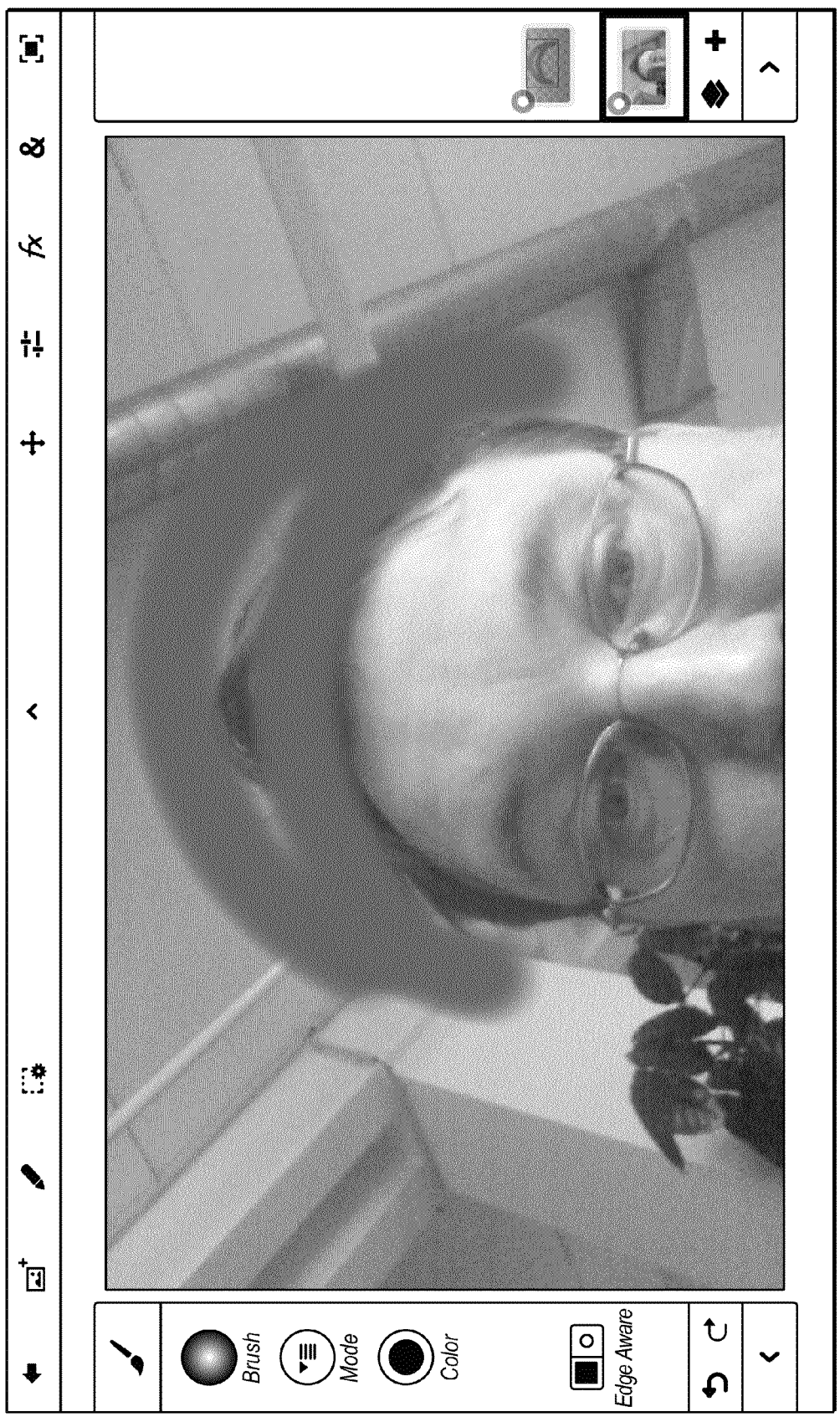

FIG. 2F illustrates an example result of selection of the shutter input option from FIG. 2E. As shown, the image of FIG. 2F is a higher resolution image than the image of FIG. 2E. The image of FIG. 2F may be referred to as the final image although, as shown in FIG. 2F, an option may be presented to retake the image. Selection of "Retake" may return the interface to the preview mode and allow for capturing another final image. "Cancel" may cancel out of the preview mode whereas "Keep" may return the content editing application to the interface of FIGS. 2A-2D for further processing and/or editing. An example result from selecting "Keep" is shown in FIG. 2G. In the right hand column, it can be seen that the picture of the man is on the bottom layer and the two arches are on the top layer. The ordering of the layers is reflected in the display of the composite image with the arches overlaid on top of the man.

Figure 3A:
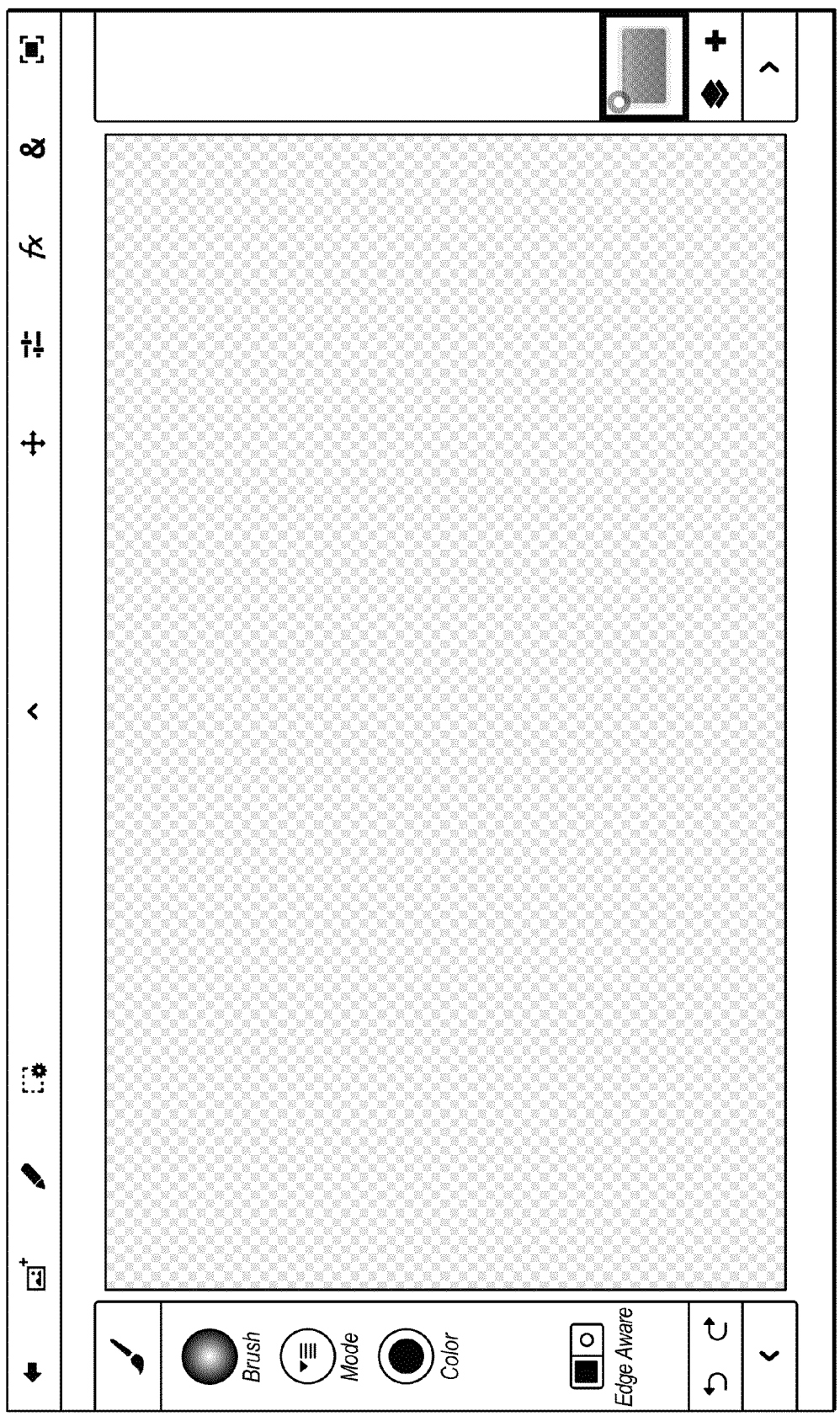
FIGS. 3A-3G illustrate example screenshots of an example image editing application that may implement the disclosed camera fill techniques, according to various embodiments.
Figure 3B:
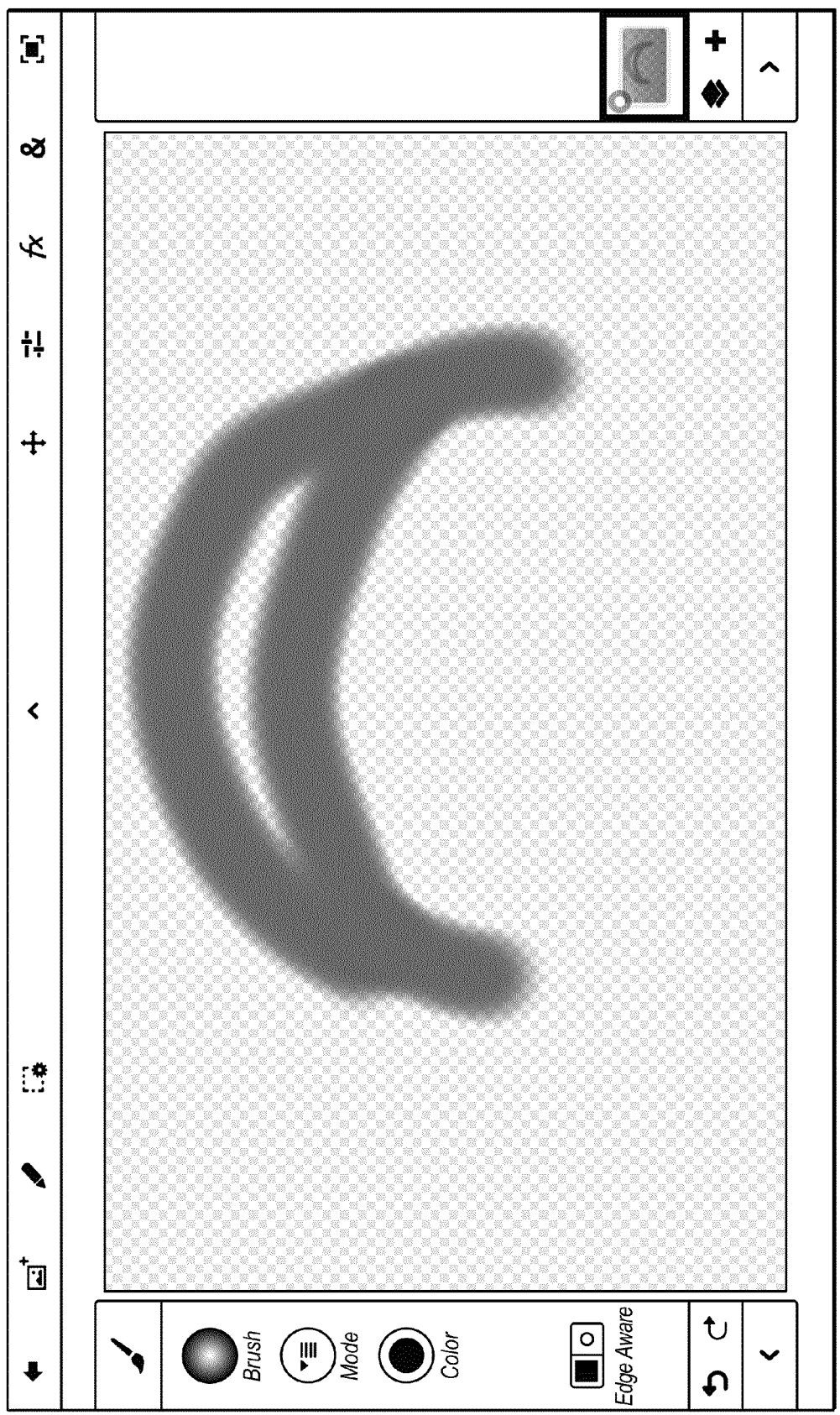

FIG. 3A is largely the same as FIG. 2A in that FIG. 3A shows a single checkerboard layer that corresponds to what is displayed in the content area of the display. FIG. 3B is likewise similar to FIG. 2B in that FIG. 3B shows a pattern (two arches) drawn into the selected layer.

Figure 3C:
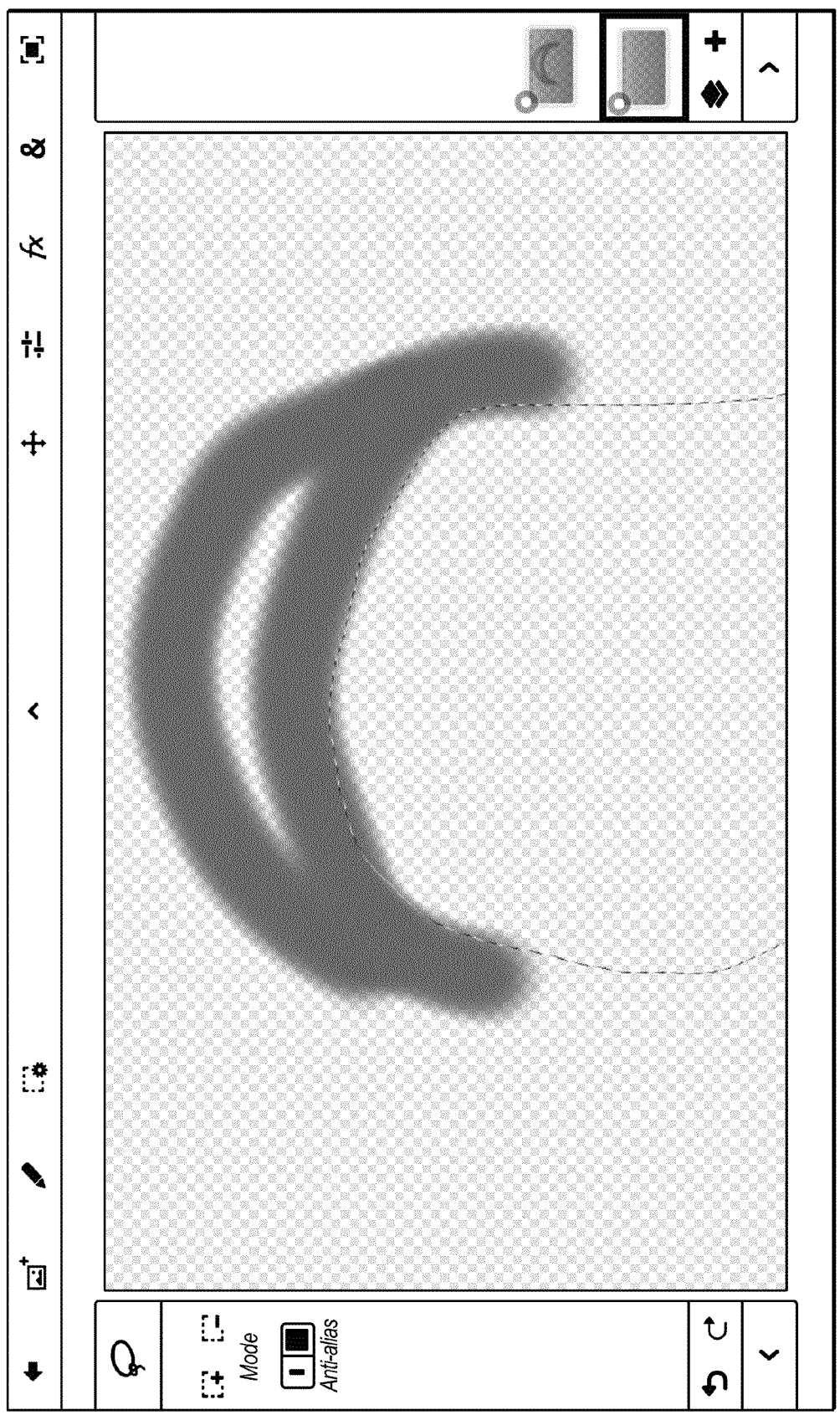
Figure 3D:
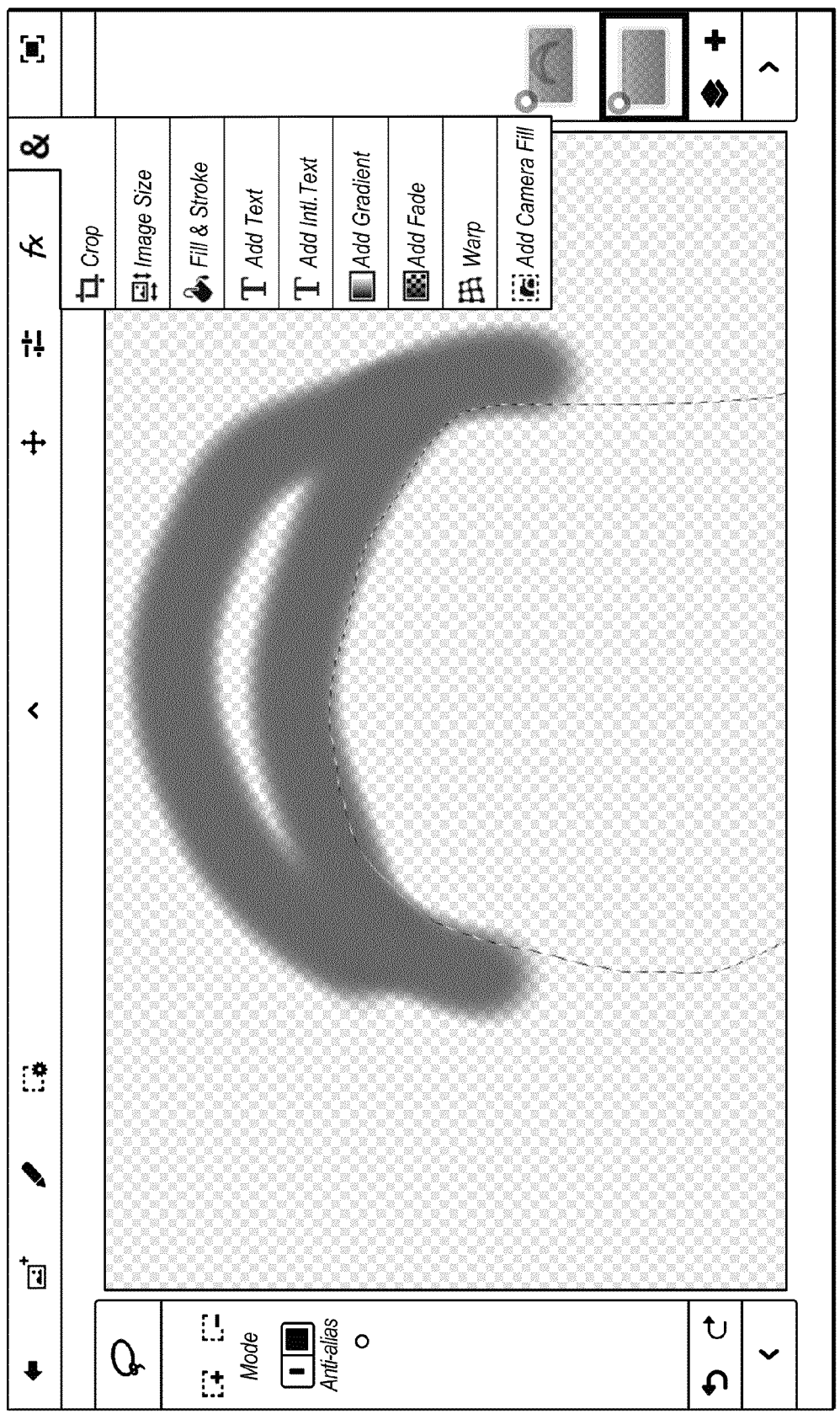
Figure 3E:
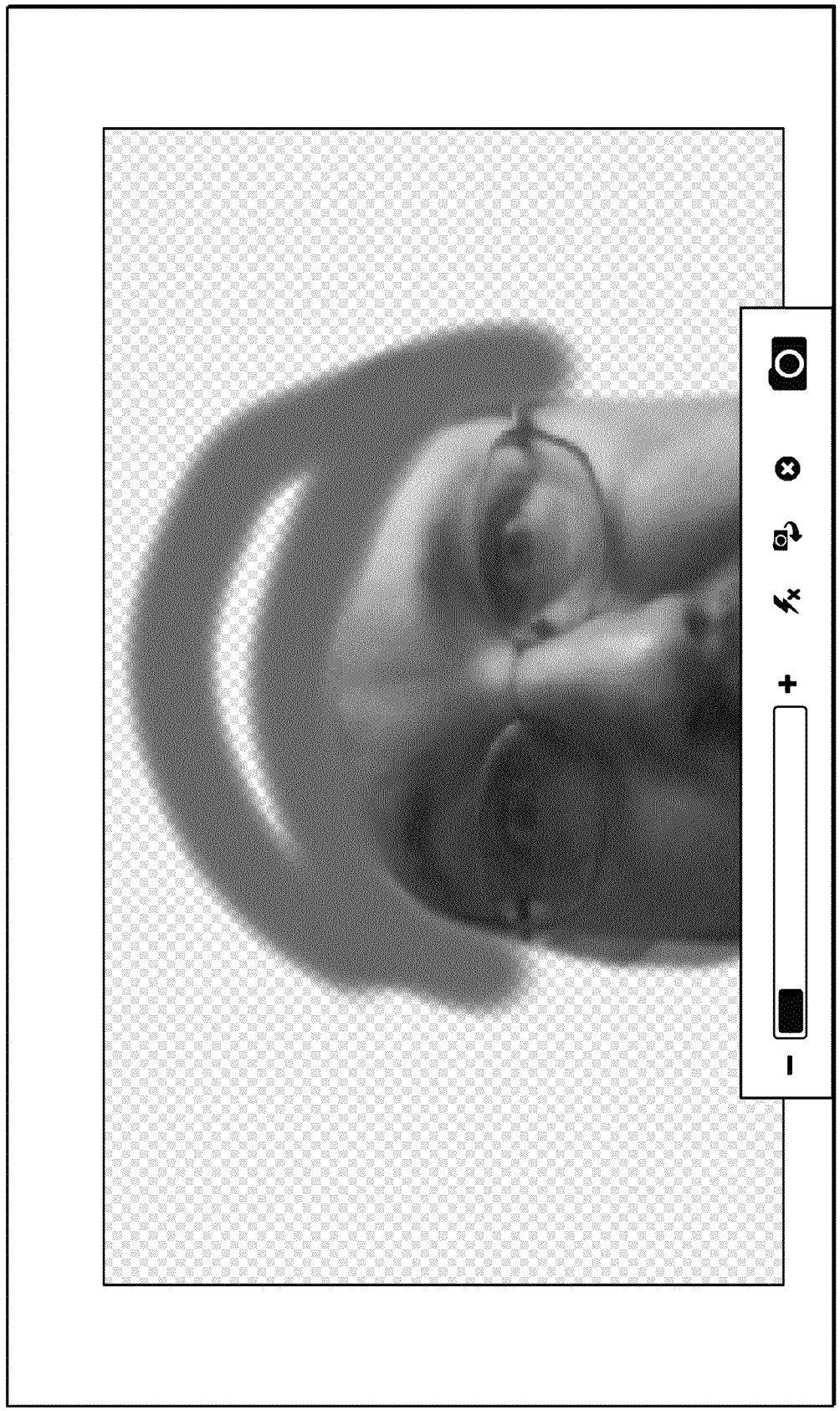

FIG. 3C illustrates moving the drawn pattern into a separate layer on top of the original layer, as indicated by the layer stack in the right hand column. FIG. 3C further illustrates defining a region within one of the layers (e.g., the bottom layer). As shown in FIG. 3C, a lasso tool may be used to draw a region that defines a boundary within the selected layer. The region is indicated with the dashed line in FIG. 3C. FIG. 3D illustrates selecting the Add Camera Fill option as in FIG. 2D. In the illustrated preview mode of FIG. 3E, the displayed preview image data from the camera is within the defined region of the selected layer, as compared with FIG. 2E where the image from the camera fills the entire layer. In other embodiments, the displayed preview image data may be outside of the defined region.

Figure 3F:
Figure 3G:
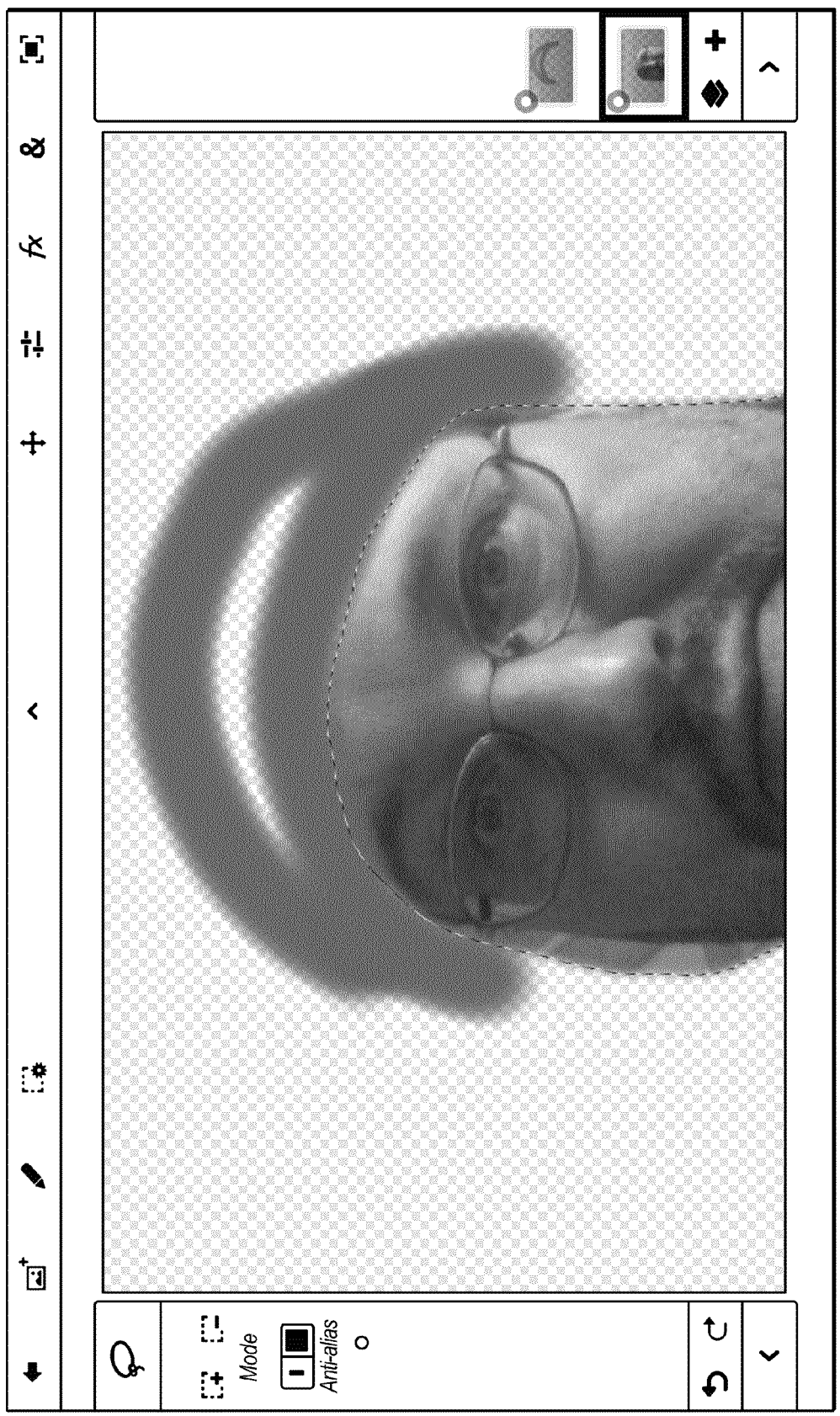

Similar to FIG. 2F, FIG. 3F illustrates a higher resolution image than the image of FIG. 3E. The image of FIG. 3F may be referred to as the final image although, as shown in FIG. 3F, an option may be presented to retake the image. Selection of "Retake" may return the interface to the preview mode and allow for capturing another final image. "Cancel" may cancel out of the preview mode whereas "Keep" may return the content editing application to the interface of FIGS. 3A-3D. An example result from selecting "Keep" is shown in FIG. 3G. In the right hand column, it can be seen that the picture of the man is on the bottom layer and the two arches are on the top layer. The ordering of the layers is reflected in the display of the composite image in the center of the display.

In another example application, the camera fill input may permit a blend mode, such as a lighting blend mode. For example, one layer may include content (e.g., a picture of a dark room) and camera fill may be used for another layer. The camera fill may be selected for the selected layer and a light (e.g., a flashlight) may be pointed into the camera lens such that the camera receives light to lighten the scene of the dark room. A spotlight effect or general increased brightness may result depending on the intensity and direction of the light received by the camera. As in the other examples, a live preview mode may permit the desired lighting effect to be previewed before the final, high resolution image is captured.

Example Implementations

Figure 4:
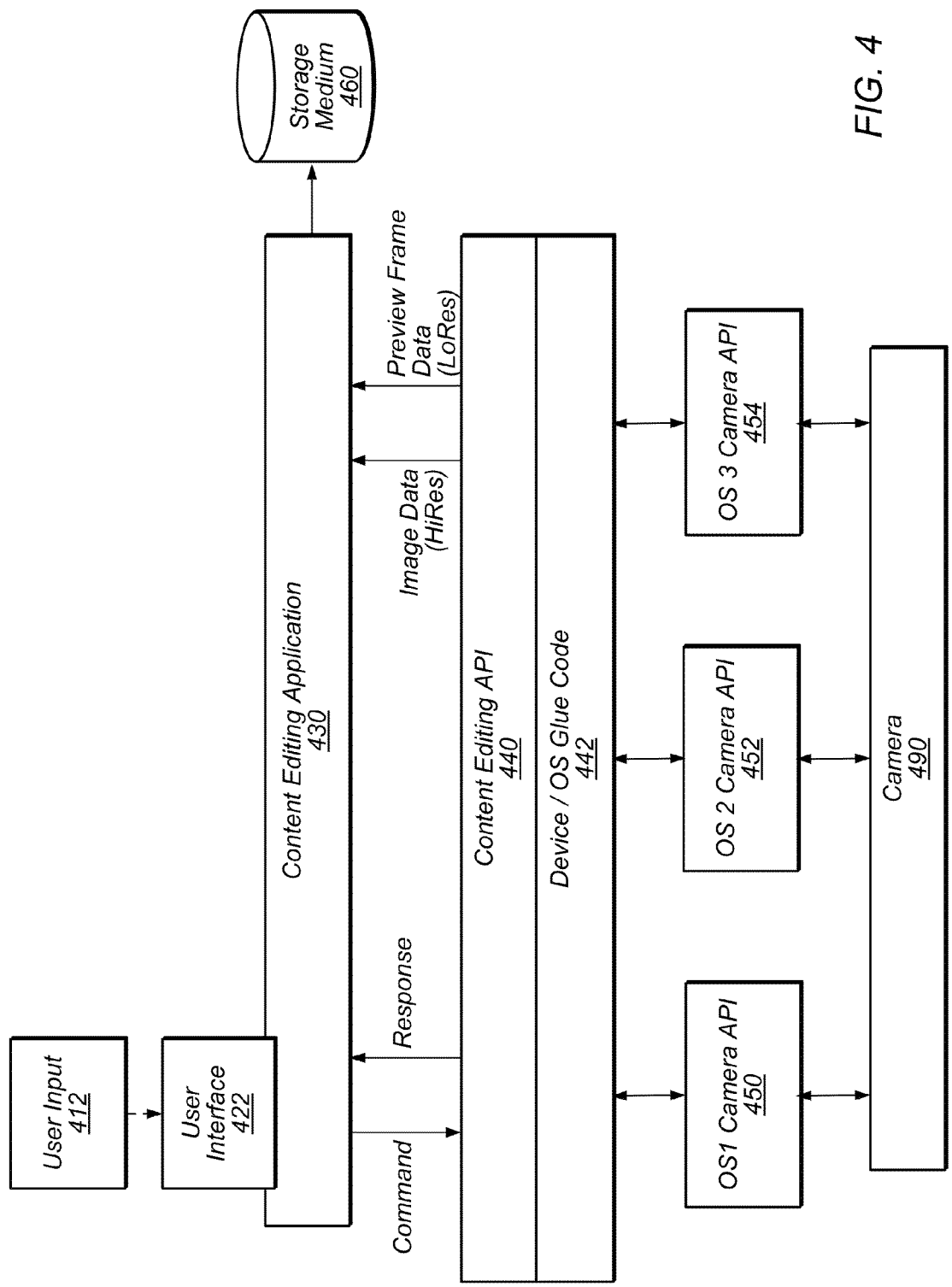
FIG. 4 illustrates a module that may implement the disclosed camera fill techniques within an image editing application, according to some embodiments.
Figure 5:
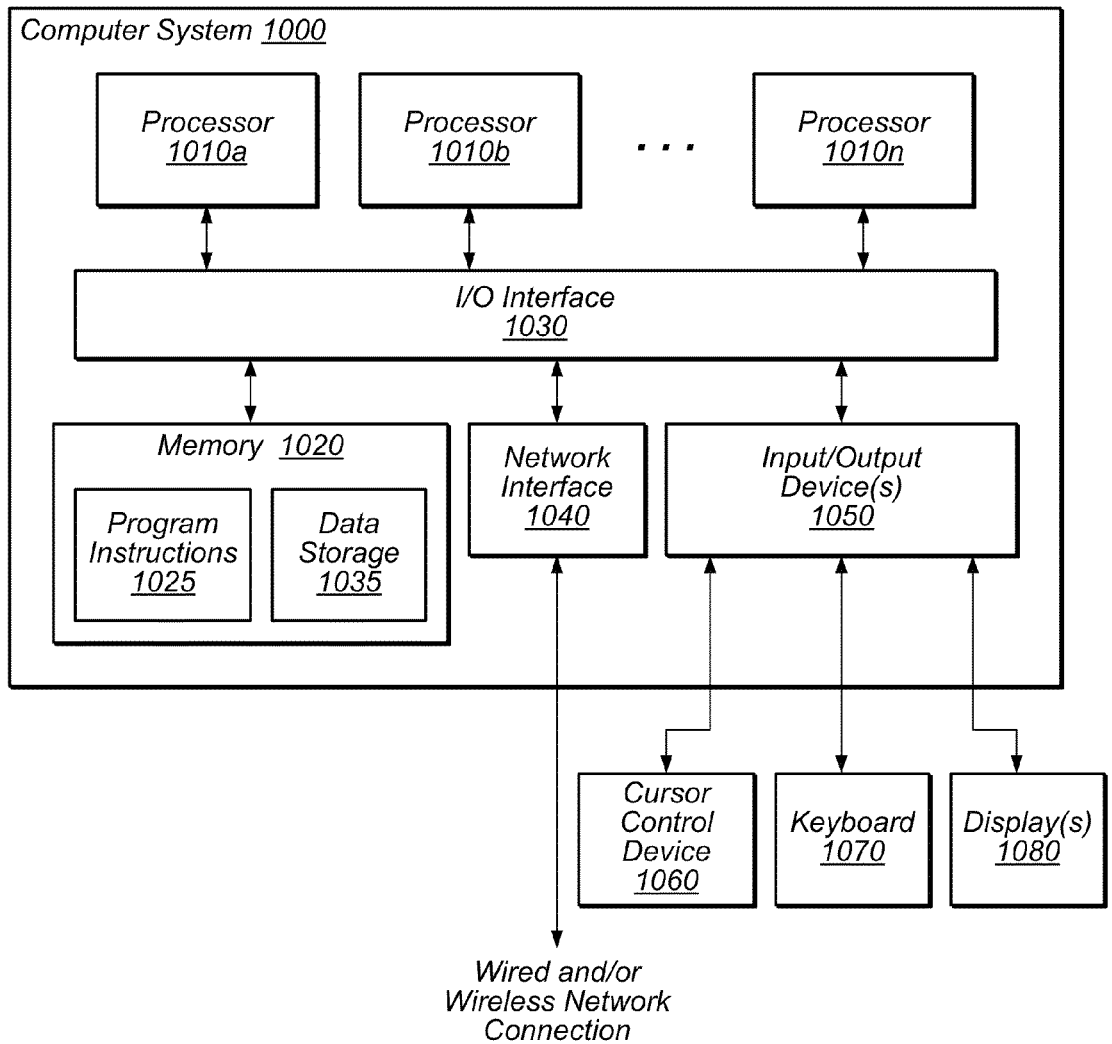
FIG. 5 illustrates an example computer system that may be used in embodiments.

FIG. 4 illustrates an example content editing application 430 that may implement camera fill methods and workflows as illustrated in FIGS. 1, 2A-2G, and 3A-3G. Embodiments of content editing application 430 may be implemented in any image processing application. FIG. 5 illustrates an example computer system on which embodiments of content editing application 430 may be implemented.

Content editing application 430 may receive user input 412 via user interface 422. Example user input 412 may include a touch (e.g., finger, mouse, stylus, etc.) input to a user interface of a tablet device, mobile device, or desktop computer or some other input. For example, one input may be a selection of a shutter/camera icon that may cause content editing application 430 to send a command to camera 490 to take a high resolution image. Other examples of selectable inputs to which user input 412 may be received via user interface 422 are shown in FIGS. 2A-2G and 3A-3G.

As described herein, content editing application 430 may be configured to communicate with a camera 490 coupled to the computing device executing content editing application 430. Various examples of commands/requests/communication between content editing application 430 and camera 490 via an API (e.g., an OS-specific API), as described herein. In the example implementation shown in FIG. 4, content editing application 430 may communicate with camera 490 via content editing API 440 (e.g., an API to handle the disclosed camera fill techniques), device/OS glue code 442 (e.g., code to interface with a variety of operating systems), and one of the OS APIs (e.g., OS1 Camera API 450, OS 2 Camera API 452, OS 3 Camera API 454). Three OS-specific camera APIs are shown in the example implementation of FIG. 4 for ease of explanation. Other embodiments may include additional or fewer OS APIs. As an example, OS1 may be iOS, OS2 may be Android, and OS3 may be Windows Mobile. If a device is running OS1, then OS1 Camera API 450 may be used for that device. Selection of the proper OS Camera API may be performed automatically in response to detecting the operating system of the device. In embodiments in which a device is equipped with multiple operating systems, the active OS may be detected and the proper OS camera API may be selected. In other embodiments, OS APIs may exist for desktop operating systems as well.

As shown in FIG. 4, content editing application 430 may send a command to one of the OS camera APIs and/or camera 490 via content editing API 440 and device/OS glue code 442. Camera 490 and/or the OS camera API 450/452/454 may provide a response to content editing application 430 via device/OS glue code 442, and/or content editing API 430. Note that each command/response may not travel through the illustrated path. Moreover, in one example sequence, a command may be followed by a response. But in other examples, a response may not be a response to a command but instead may be a transmission that was not first requested. For example, information may be pushed to content editing application 430 without content editing application 430 first requesting that information. Additionally, multiple commands may be sent in a row without a response and multiple responses may be sent in a row without intervening commands. Although shown separately from the response path in FIG. 4, the image data (HiRes) and preview frame data (LoRes) may be a type of response. As described herein, preview frame data may be lower resolution than the final image data. Such image data may be pushed to content editing application or pulled by content editing application (e.g., periodically).

Content editing application 430 may generate as output one or more composite images that include a layer having image data from the disclosed camera fill techniques and one or more other layers that include other image data (e.g., 2D vector graphics, 3D graphics, text, etc.). Example composite images are shown in FIGS. 2G and 3G. A composite image may, for example, be printed, displayed on a display device, transmitted to other computer systems via wired or wireless communication media, and/or stored to a storage medium 460, such as system memory, a disk drive, DVD, CD, etc. A composite image may be further processed according to other image processing methods and techniques within content editing application 430.

Program instructions and/or data for implementing embodiments of a content editing application as described herein may, for example, be stored on a computer-readable storage medium. A computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Example System

Embodiments of an image editing application as described herein may be executed on one or more computer systems, which may interact with various other devices. One such computer system is illustrated by FIG. 5. In various embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, tablet device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the camera fill methods disclosed herein may, at least in part, be implemented by program instructions configured for execution on one of, or parallel execution on two or more of, such GPUs. The GPU(s) may implement one or more APIs that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of image editing application are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 5, memory 1020 may include program instructions 1025, configured to implement embodiments of an image editing application as described herein, and data storage 1035, comprising various data accessible by program instructions 1025. In one embodiment, program instructions 1025 may include software elements of embodiments of an image editing application as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of an image editing application as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:
   receiving user drawn image data by an image editing application executing on a computing device;
   receiving, by the image editing application, preview image data, the preview image data comprising periodically updated data obtained from an image sensor coupled to the computing device;
   displaying the preview image data concurrently with the user drawn image data within a portion of an interface of the image editing application, the preview image data associated with one layer of a plurality of image layers and the user drawn image data associated with one or more other layers of the plurality of image layers, the preview image data filling an area behind the user drawn image data within the portion;
   responsive to a user selecting a layer of the one or more other layers of the plurality of image layers, stopping updating the series of image frames and not displaying the preview image data concurrently with the user drawn image data; and
   responsive to a request from the image editing application that the image sensor capture a final image, capturing and displaying the final image concurrently with the user drawn image data within the interface of the image editing application, the final image replacing the preview image data in the one layer.

2. The method of claim 1, further comprising prior to capturing and displaying the final image, the image editing application receiving an input indicating a request to capture the final image.

3. The method of claim 1, wherein the preview image data includes a series of image frames captured sequentially by the image sensor, wherein said displaying the preview image data includes updating the interface with the series of image frames in an order of the sequential capture, further comprising:
   stopping said updating the series of image frames in response to the content editing application receiving the captured final image.

4. The method of claim 1, wherein the portion is determined by a user selection of the portion from a display area of the interface of the image editing application.

5. The method of claim 1, further comprising the content editing application pulling the preview image data in response to a periodic request by the content editing application for the preview image data, wherein said pulling is performed periodically in response to the periodic request.

6. The method of claim 1, wherein said receiving the preview image data occurs in response to a frame of the preview image data being available.

7. The method of claim 1, wherein the preview image data is lower resolution than the final image.

8. The method of claim 1, wherein the computing device is a mobile device, and wherein the image sensor is a camera housed in the mobile device.

9. The method of claim 1, wherein the preview image data includes a plurality of image frames captured by the image sensor over time, wherein said displaying the preview image data includes updating the displayed preview image data in real-time.

10. The method of claim 1, wherein the user drawn image data comprises 2D vector graphics, 3D graphics, or text.

11. The method of claim 1, further comprising, responsive to a user input to the image editing application, stopping said updating the data obtained from the image sensor and not displaying the preview image data concurrently with the user drawn image data.

12. A non-transitory computer-readable storage medium storing program instructions, the program instructions computer-executable to implement operations comprising:
    receiving user drawn image data, by an image editing application executing on a computing device;
    receiving, by the image editing application, preview image data, the preview image data comprising periodically updated data obtained from an image sensor coupled to the computing device;
    displaying the preview image data concurrently with the user drawn image data within a portion of a display of the image editing application, the preview image data associated with one layer of a plurality of image layers and the user drawn image data associated with one or more other layers of the plurality of image layers, the preview image data filling an area behind the user drawn image data within the portion;
    responsive to a user selecting a layer of the one or more other layers of the plurality of image layers, stopping said updating the series of image frames and not displaying the preview image data concurrently with the user drawn image data; and
    responsive to a request from the image editing application that the image sensor capture a final image, capturing and displaying the final image concurrently with the user drawn image data within the display of the image editing application, the final image replacing the preview image data in the one layer.

13. The non-transitory computer-readable storage medium of claim 12, wherein the preview image data includes a series of image frames captured sequentially by the image sensor, wherein said displaying the preview image data includes updating the display with the series of image frames in an order of the sequential capture, and wherein the program instructions are further computer-executable to implement:
    stopping said updating the series of image frames in response to the content editing application receiving the captured final image.

14. The non-transitory computer-readable storage medium of claim 12, wherein the portion is determined by a user selection of the portion from a display area of the image editing application.

15. The non-transitory computer-readable storage medium of claim 12, wherein the preview image data includes a plurality of image frames captured by the image sensor over time, wherein said displaying the preview image data includes updating the displayed preview image data in real-time.

16. The non-transitory computer-readable storage medium of claim 12, wherein the user drawn image data comprises 2D vector graphics, 3d graphics, or text.

17. A non-transitory computer-readable storage medium storing program instructions, the program instructions computer-executable to implement:
  receiving user drawn image data by an image editing application executing on a computing device;
  receiving, by the image editing application, a user selection of a portion of a display area of the image editing application;
  receiving, by the image editing application, preview image data, the preview image data comprising periodically updated data obtained from an image sensor coupled to the computing device, the preview image data displayed in a layer of a plurality of image layers of the image editing application;
  displaying the preview image data, relative to the selected portion of the display area, concurrently with the user drawn image data within an interface of the image editing application, the preview image data filling an area behind the user drawn image data within the selected portion;
  responsive to a user selecting another layer of the plurality of image layers, stopping said updating the data obtained from the image sensor and not displaying the preview image data concurrently with the user drawn image data; and
  responsive to a request from the image editing application that the image sensor capture a final image, capturing and displaying the final image, relative to the selected portion of the display area, concurrently with the user drawn image data within the interface, the final image replacing the preview image data in the layer of the plurality of image layers.

18. The non-transitory computer-readable storage medium of claim 17, wherein the preview image data includes a series of image frames captured sequentially by the image sensor, wherein said displaying the preview image data includes updating the interface with the series of image frames in an order of the sequential capture, and wherein the program instructions are further computer-executable to implement:
  stopping said updating the series of image frames in response to the content editing application receiving the captured final image.

19. The non-transitory computer-readable storage medium of claim 17, wherein the program instructions are further computer-executable to implement:
  displaying the user drawn image data in one or more other layers of the plurality of image layers.

20. The non-transitory computer-readable storage medium of claim 17, wherein said receiving the preview image data occurs in response to a frame of the preview image data being available.

* * * * *